United States Patent [19]

Tomioka et al.

[11] Patent Number: 4,635,112

[45] Date of Patent: Jan. 6, 1987

[54] METHOD AND APPARATUS FOR RECORDING SCRAMBLED TELEVISION SIGNALS

[75] Inventors: Masao Tomioka, Yamato; Takashi Okada, Yokohama; Takao Mogi, Tokyo, all of Japan

[73] Assignee: Sony Corporation, Tokyo, Japan

[21] Appl. No.: 583,318

[22] Filed: Feb. 24, 1984

[30] Foreign Application Priority Data

Feb. 28, 1983 [JP] Japan ................... 58-32019

[51] Int. Cl.⁴ .......................................... H04N 7/167
[52] U.S. Cl. ................................... 358/122; 358/123; 360/27
[58] Field of Search ............... 358/122, 124, 335, 123; 360/33.1, 27, 60

[56] References Cited

U.S. PATENT DOCUMENTS 4,439,785  3/1984  Leonard ................... 360/27
4,533,949  8/1985  Fujimura et al. ............ 360/27

FOREIGN PATENT DOCUMENTS 2078052  5/1981  United Kingdom .

Primary Examiner—S. C. Buczinski
Attorney, Agent, or Firm—Lewis H. Eslinger; Alvin Sinderbrand

[57] ABSTRACT

A scrambled television program is received and recorded in a scrambled fashion automatically in a video tape recorder by detecting program code signals placed in vertical blanking intervals of ten fields preceding the commencement of the scrambled program signal and upon sensing such program code signals the video tape recorder is activated to record the scrambled television program. A stop code signal is arranged following the coded television program and is detected for stopping operation of the video recorder, so that the scrambled program is recorded without requiring the manual setting of automatic timers or the like. In addition to the program code, a key code, and scene change signals are transmitted and these are used to produce a descramble pattern to descramble the television program when it is reproduced by the video tape recorder. By placing the key code after the television program, the entire program must be recorded in scrambled form before it can be reproduced and descrambled for viewing, thereby automatically recording the scrambled program without requiring a timer.

18 Claims, 7 Drawing Figures

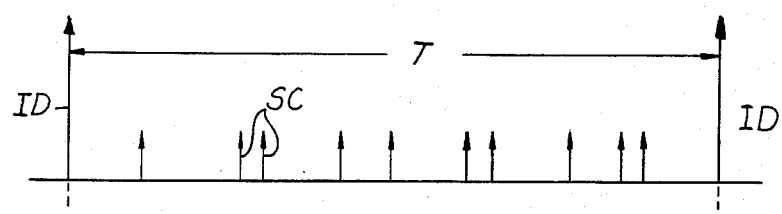
FIG. 1A
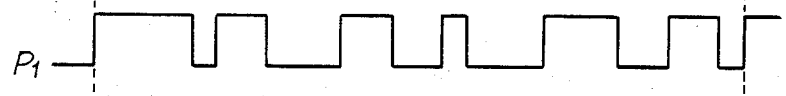
FIG. 1B
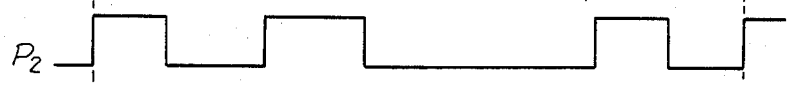
FIG. 1C
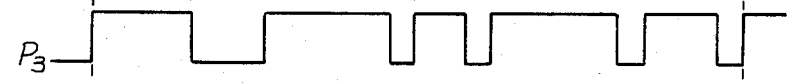
FIG. 1D
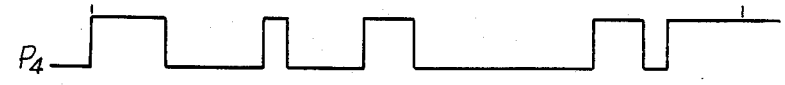
FIG. 1E
FIG. 2
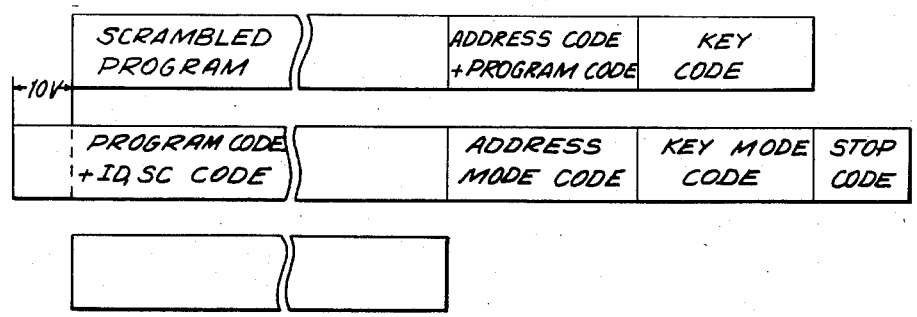

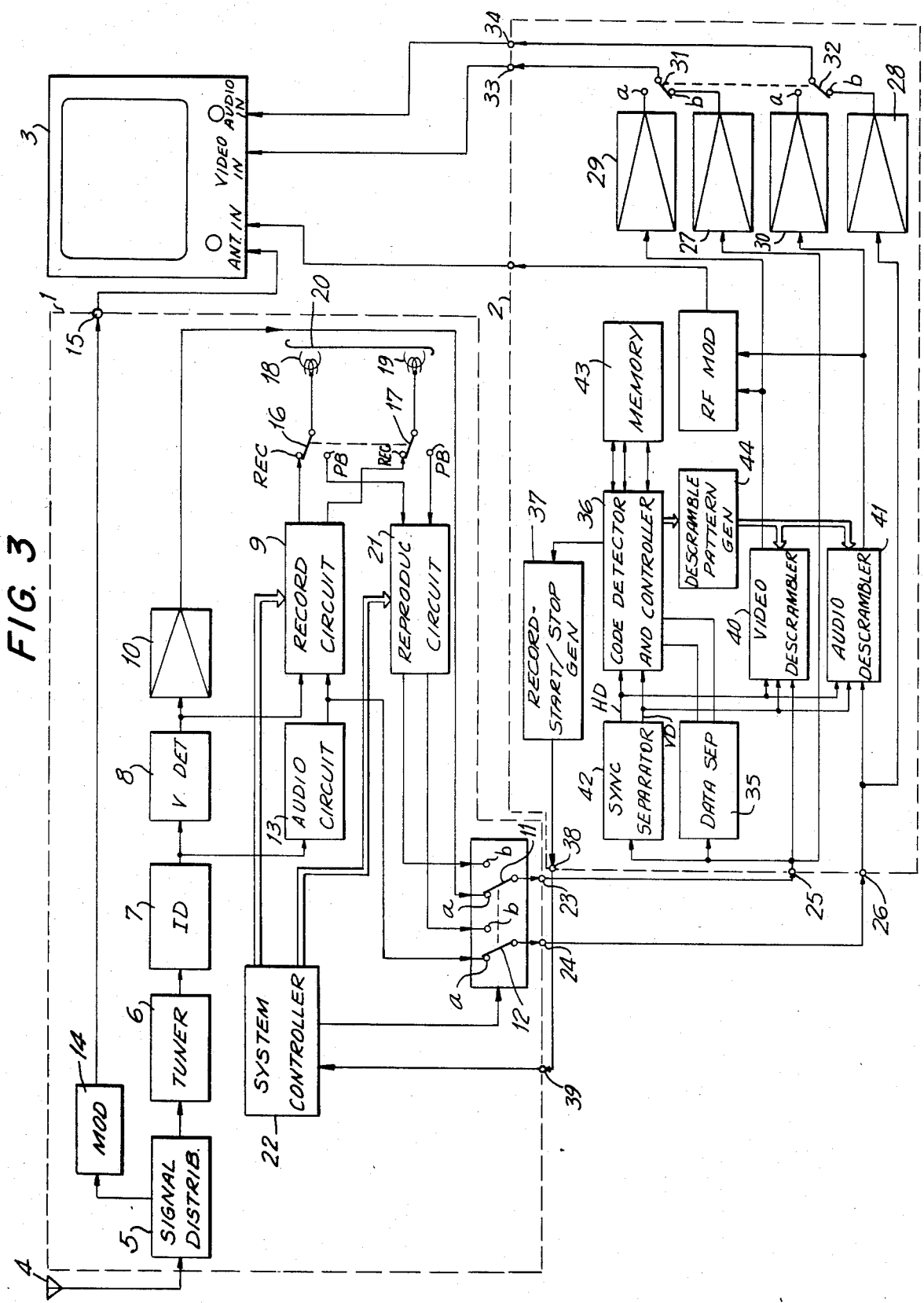

METHOD AND APPARATUS FOR RECORDING SCRAMBLED TELEVISION SIGNALS

BACKGROUND OF THE INVENTION

1. Field of the Invention

The invention relates generally to recording scrambled television signals and, more specifically, relates to apparatus for recording scrambled television signals automatically without requiring a timer for subsequent playback in an unscrambled mode.

2. Description of the Prior Art

Television broadcasting systems are now well known in which a broadcasting station transmits a scrambled or coded television signal and the consumer, after making the appropriate technical and financial arrangements with the broadcasting company, receives the signal and descrambles or decodes it by means of a decoder supplied by the broadcasting company for viewing.

One example of this kind of scrambled signal television broadcasting system transmits a video signal that is periodically inverted in polarity for a predetermined period of time or that is periodically changed in order or sequence for a predetermined period of time. A corresponding code to correct the polarity or sequence of the signals is provided in a decoder at the receiver, whereby the transmitted signals are decoded prior to viewing.

There also has been proposed a system in which a transmitting scrambled television signal is received and recorded directly in scrambled form by a video tape recorder (VTR) and, subsequently, the recorded, scrambled signal is played back through a decoder for viewing. In such proposed system, the scrambled signals are broadcast during times other than usual broadcast hours for prime time programming, for example, after midnight, and the signal is then recorded automatically using a timer. Thus, the exact time that the scrambled program is to be broadcast and the exact length of such program must be known ahead of time and, if not, the automatic recording of the scrambled broadcast cannot be accomplished satisfactorily. Another problem is that the automatic timers on many VTR's are difficult for the average consumer to set properly and, frequently, the desired program is not recorded correctly. Furthermore, in the case of brief power outages not only will the clock in the video tape recorder be slow, thereby causing the first portion of the desired program to be missed, but also the setting in the timer of most VTR's is cleared when losing power and, thus, no recording will take place.

OBJECTS AND SUMMARY OF THE INVENTION

Accordingly, it is an object of the present invention to provide apparatus for recording a scrambled television signal that avoids the drawbacks inherent in the prior art.

It is another object of the present invention to provide video recording apparatus that can record automatically a scrambled television signal without requiring a timer.

A further object of the present invention is to provide a method and apparatus whereby a scrambled signal is automatically recorded in a video tape recorder without the use of a timer, for subsequent playback in an unscrambled mode using key codes and start and stop signals contained within the transmitted scrambled television signal.

In one aspect of the present invention, when a scrambled television signal that includes a start signal and a stop signal is broadcast, the received video signal is supplied to a decoder through a video tape recording apparatus (VTR), the start signal and the stop signal are detected in a decoder, and control signals are fed back to the recording apparatus to start and stop the recording operation. Thus, scrambled television signals are automatically recorded, without requiring a timer, for subsequent descrambling and viewing.

The above, and other objects, features, and advantages of the present invention will become apparent from the following detailed description of illustrative embodiments thereof to be read in conjunction with the accompanying drawings.

BRIEF DESCRIPTION OF THE DRAWINGS

FIG. 1 is a timing chart useful in explaining the operation of the present invention;

FIG. 2 is a representation of a magnetic tape showing the manner in which information is recorded thereon according to the present invention; and FIG. 3 is a schematic block diagram of a scrambled television signal recording, decoding, and display apparatus according to the present invention.

DETAILED DESCRIPTION OF PREFERRED EMBODIMENTS

The principal object of a system that broadcasts scrambled television signals is to prevent unauthorized viewing of the program material and to prevent nonsubscribers from obtaining the benefit and enjoyment of the scrambled transmitted programs without paying the appropriate fees. Various methods of coding and scrambling video signals have been proposed, and in one such scrambling method the video signal is periodically inverted in polarity every predetermined number of fields. Descrambling is then accomplished by knowing the periodicity of the polarity inversion. Nevertheless, the problem with this approach is that the scrambled signal cannot be descrambled and displayed correctly if the scrambled signal has become distorted during transmission or reception. For example, when a polarity inverted signal has been distorted during transmission and is then re-inverted in a polarity by decoder, there will be some signal level difference and waveform distortion produced. Upon viewing this reinverted signal on a video monitor, a disconcerting visual flicker will be produced every time the signal is re-inverted. This flicker is particularly conspicuous when viewing still pictures that is, one video frame. Moreover, this flicker is even more likely to be a problem when the scrambled video signal is recorded and played back by a video tape recorder, because all video tape recorders employ non-linear direct current (DC) and alternating current (AC) circuits that will accentuate the flicker. This flicker problem is overcome according to the present invention by performing the polarity re-inversion only at times synchronized with changes in scene brightness and, thus, flicker cannot be detected by the eye.

Referring to FIG 1A, a period T of arbitrary length, for example, 60 seconds, is determined and marked off by adding periodic index signals ID, represented in FIG. 1A by the taller arrows, to a television signal that comprises a special program to be broadcast in a scrambled form. At the same time, changes of scene brightness are detected, from the luminance signal for example, and a scene change signal $S_C$ is generated, the scene change singals $S_C$ are represented in FIG. 1A by the shorter vertical arrows. A key signal $P_1$ is provided that has the period T, which is determined by the index signals ID, and the waveform of key signal $P_1$ is represented in FIG. 1B. Key signal $P_1$ has an optional or arbitrary pattern, with the only requirement being that the rising (trailing) edges and falling (leading) edges of the rectangular waveform of the key signal $P_1$ of FIG. 1B must be synchronized with the field periods of the video signal (not shown). The key signal $P_1$ can be changed from time to time to prevent unauthorized descrambling, as will be explained in detail hereinbelow. By using the scene change signals $S_C$, the periodic index signals ID, and the key signal $P_1$ in various logic circuit combinations, several different scramble patterns can be formed, for example, scramble patterns $P_2$, $P_3$, and $P_4$, as shown in FIGS. 1C, 1D, and 1E, respectively, are formed using only the signals shown in FIGS. 1A and 1B. One of these scramble patterns can be used to control the polarity inversion of the video signal being transmitted and to decode the scrambled signal at the receiver for playback. In this embodiment, the polarity of the video signal is inverted each time a scramble pattern signal $P_2$, $P_3$ or $P_4$ has a high level.

The scramble pattern $P_2$ of FIG. 1C is formed by a logical AND operation between the scene change signals SC and the key signal $P_1$ and following the logical AND operation the level of the AND gate output is inverted to form the scramble pattern waveform $P_2$. The waveform of scramble pattern $P_3$ of FIG. 1D is generated by having the signal level or logic level raised at each occurrence of the scene change signal SC or at each occurrence of the index signal ID, and the signal level lowered at each leading (falling) edge of key signal $P_1$. Scramble pattern $P_4$ of FIG. 1E is generated by having the signal level raised by a logical AND operation between scene change signal $S_C$ or index signal ID and scramble pattern $P_1$ and following this logical AND operation the output signal level is lowered at each independent occurrence of the scene change signal SC. Of course, there are many other scramble patterns that can be formed by combining the scene change signal $S_C$, the index signal ID, and the key signal $P_l$ in various logic circuit operations, however, by using scramble patterns $P_2$, $P_3$, and $P_4$ according to the present invention there is no flicker produced in the visual display on the video monitor, because the polarity of the signal is inverted only in synchronism with changes in scene brightness and, thus, any flicker caused by the polarity inversion caused by the scrambling is not detectable by the eye. Moreover, the ability to easily create a great number of scramble patterns makes it unlikely that one could decode the scrambled signal without subscribing and using the provided decoder.

One format for a scrambled television signal suitable for use with the present invention is represented in FIG. 2, in which the scrambled program, the address code and program code, and the key code are broadcast in that order during the video interval or information period. The program codes, the index signal code and scene change signal code, the address mode key, the key mode code, and the stop code are broadcast in that order during the vertical blanking intervals of the video signal. The audio portion of the transmitted signal consists of a completely scrambled sound signal, which may be scrambled according to any advantageous pattern, including the various above-described previously known patterns, since flicker is not a problem in audio. The address code, located in the video interval, is the coded signal corresponding to the number previously assigned to the particular subscriber, that is, an individualized subscriber's address. One use of such address code could be to disable the decoder of one who has not paid the current subscription installment. The key code is the code, $P_1$ of FIG. 1B for example, that was used in connection with the index signal and scene change signal to generate the scramble pattern to scramble the signal, and this key code is also used to descramble the signal.

In this embodiment, the key code is positioned at the very end of the video interval following the complete scrambled program and the address code and program code, so that the scrambled program signal that is being transmitted can only be descrambled after the entire program has been received and recorded by the video tape recorder. This key code can be stored in a memory when the program is recorded and subsequently read out for descrambling the reproduced signal at a later time. Thus, by placing the key code at the end of the video interval, the transmitted program cannot be watched in real time but must be time shifted by means of the video tape recorder by at least the actual length of the program. Of course, the key code does not have to be at the end of the video interval, it can be arranged at the beginning of the scrambled program or it can be separated into two pieces, with a portion at the beginning and a portion at the end, or it can be located at the beginning of the scrambled program and stored in a memory that is not available for read out until after a certain time has elapsed, for example, after most of the program has already been received and recorded in the scrambled state.

The program code is located after the scrambled program and before the key code and it appoints or selects the key code in accordance with the program being transmitted. The key code can be changed yearly, monthly, weekly, daily, or on a program-to-program basis, whatever is necessary in order to prevent nonsubscribers from decoding and watching transmitted, scrambled programs. If a number of different programs have been recorded, or if there are several recorded tapes, there will be many different key codes contained in the memory. The program code and key code are stored as pairs in the memory in such a manner as to correspond with each other. Accordingly, the appropriate key code is chosen from the memory by reproducing the program code when the program is to be reproduced for viewing after it has been recorded in scrambled form. A typical example of a program code might be the date of the broadcast and a specific program number.

The program code is also inserted in the vertical blanking period of the scrambled signal along with the index signal ID code and the scene change signal SC code. The address mode code follows the program code and ID and SC code in the vertical blanking interval and indicates that the address code is being broadcast in order to make ready the appropriate memory section. Similarly, the following key mode code indicates that the key code is being broadcast. The stop signal follows the key mode code in the vertical blanking interval and indicates that the scrambled broadcast has ended. All of the above codes are nonreturn-to-zero (NRZ) modulated binary signals, each of which has a predetermined number of bits, though all of the codes need not be the same length. Each of the codes that are inserted in the vertical blanking periods are inserted at the 14th and 15th horizontal scanning periods.

The program code is inserted at the appropriate scan periods of the vertical blanking periods ten video fields (10V) before the scrambled program starts and is also inserted in the video information period after the scrambled program has finished, that is, after it has been totally recorded by the video tape recorder. The program code is continuously inserted for the ten video fields preceding the scrambled program and is used to start recording of the scrambled signal. At the receiver side of the above-described scrambled broadcast, the index signals, the scene change signals, and the key code are all detected so that the scramble pattern can be produced when necessary. Based on this generated scramble pattern, the polarity of this scrambled signal is inverted appropriately and the signal is effectively descrambled for viewing.

A system to accomplish receiving, recording, and decoding of the scrambled program after it has been recorded in a video tape recorder according to the present invention is shown in FIG. 3, in which the principal functional elements are video tape recorder 1, decoder 2, and video monitor or television receiver 3. The scrambled audio and video signal is received at antenna 4 and is fed through signal distributor 5, tuner 6 and intermediate-frequency (IF) amplifier 7 to video detector 8, which demodulates the video signals. Following demodulation in the video detector 8, the signal is fed to a recording circuit 9 and also to fixed contact a of switch 11 after having been passed through buffer amplifier 10. The IF output of IF amplifier 7 is fed to audio demodulator 13, in which the audio signal is demodulated, and the demodulated audio signal is fed to recording circuit 9 and also to fixed contact a of switch 12. Recording circuit 9 can be one of any well-known configurations for processing video and audio signals for recording on magnetic tape.

The signal from distributor 5, which may be a signal splitter, is converted to the frequency of a locally unused channel, typically channel 2 or 3, in RF modulator 14 and fed through output terminal 15 to the antenna input of monitor television 3.

The processed video signal from recording circuit 9 is fed to a REC contact of switch 16, and when switch 16 is properly set the video signal is fed to rotary magnetic head 18 that records the processed video signal in the conventional manner as a series of slanted tracks on magnetic video tape 20. The processed audio signal from recording circuit 9 is fed to another fixed contact REC of switch 17 to magnetic audio head 19 for recording on magnetic tape 20 in correspondence with its respective video signals.

When it is desired to reproduce the audio and video signals recorded on magnetic tape 20, switches 16 and 17 are changed over to respective fixed contacts PB, and the reproduced audio and video signals are fed from the respective magnetic heads to reproducing circuit 21, which processes the signal in the well-known manner that is substantially the reverse of the processing done in recording circuit 9. The reproduced, processed audio and video signals are fed from reproducing circuit 21 to fixed contacts b of switches 11 and 12, respectively. The operation of switches 11 and 12, as well as the operation of recording circuit 9 and reproducing circuit 21, is controlled by system control circuit 22, which provides the appropriate timing. Additionally, the operation of the other sub-systems employed in a video tape recorder, which are not shown in FIG. 3 in the interest of brevity and clarity, such as the tape drive system, are controlled by the system control circuit 22.

The video and audio outputs of the video tape recorder 1 are made available at terminals 23 and 24, respectively, which are connected to respective input terminals 25 and 26 of decoder 2. When an ordinary program, that is, one which is not scrambled, is received at video tape recorder 1, switches 11 and 12 are changed over to fixed contacts a, so that the video and audio signals are fed directly to output terminals 23 and 24, respectively, without having been recorded on magnetic tape 20. The video and audio output signals at terminals 23 and 24, respectively, of video tape recorder 1 are fed to respective input terminals 25 and 26 of decoder 2 and are fed to buffer amplifiers 27 and 28, respectively. The output signals of buffer amplifiers 27 and 28 are then fed to fixed contacts b of switches 31 and 32, respectively. Switches 31 and 32 pass the signals to output terminals 33 and 34, respectively, for connection to the video-in and audio-in terminals, respectively, of video monitor 3.

When a scrambled video broadcast is to be recorded automatically, switches 11 and 12 and switches 31 and 32 are changed over to fixed contacts a, and the power is supplied to the video tape recorder 1 and decoder 2 to place them in a recording waiting mode. Switches 16 and 17 are both set to the REC contacts. As scrambled broadcast signals are received, each code signal which is contained in the video signal that is fed to decoder 2 is separated by data separating circuit 35 receiving its input from input terminal 25 of decoder 2 and providing outputs fed to code detector and controller 36. Code detector and controller 36 detects first the program code PC, which is in each of the ten video fields prior to the scrambled program.

In response to the program code and ID and SC code signals detected by code detector and controller 36 in the ten video fields before the scrambled program, recording start and recording end signal generator 37 produces a recording start signal fed out through terminal 38 of decoder 2 and into video tape recorder 1 through terminal 39. This recording start signal at terminal 39 is fed to system controller 22, which activates the recording circuit 9, as well as the tape drive system (not shown) in accordance with the recording start signal, so that video tape recorder 1 commences recording. In the recording mode, the program code and key code, as detected by code detector and controller 36, are read into and stored in memory 43 of decoder 2, both codes being in correspondence with each other. When the stop code at the end of the program has been detected by code detector and controller 36 after the scrambled program is completed, recording start and stop signal generator 37 produces a recording stop signal fed to terminal 38 of decoder 2, which is connected to terminal 39 of video tape recorder 1 and the recording stop signal is fed to system controller 22. Once the recording stop signal is received by system controller 22, operation of the recording circuit 9 is stopped, the tape drive mechanism is stopped, and the recording mode of the video tape recorder 1 ends.

Thus, as seen from the above description of the operation of circuit of FIG. 3, a scrambled television broadcast can be automatically recorded without requiring a timer that is pre-set to correspond to the starting and stopping times of the program, because the video tape recorder is started and stopped by utilizing the actual received scrambled signals that are to be recorded. More specifically, a start signal which is obtained from a program code inserted in the vertical blanking periods of ten video fields which precede the scrambled program starts the recorder and the recording operation is stopped by a stop code appearing someplace in the coded information that is being received and recorded.

When it is desired to reproduce a scrambled program that has been recorded on tape 20, switches 11 and 12 are changed over to fixed contacts b and switches 31 and 32 are changed over to fixed contacts a. As the recorded scrambled signals from tape 20 are reproduced by heads 18 and 19, the reproduced video signals are fed out at terminal 23 of video tape recorder 1 and in at terminal 25 of decoder 2 and are fed to video descrambler 40. The reproduced audio signals are fed out at terminal 24 of video tape recorder 1 and in at terminal 26 of decoder 2 and are fed to audio descrambler 41. Sync separation circuit 42 receives the input video signal from terminal 25 and separates the horizontal and vertical synchronizing signal HD and VD, respectively, and these signals are fed to code detector and controller 36, to video descrambler 40, and to audio descrambler 41 for synchronizing the operation of these respective units.

As described above, data separator 35 receives the scrambled video signal containing the program and codes and separates the data representing each of the several codes from the video signal and feeds the codes to code detector and controller 36, which detects the index code, the scene change code, and the program code. The output signal of code detector and controller 36 consists of a key code, which corresponds with the detected program code read out from memory 43. The index code, scene change code, and key codes are all supplied to descramble pattern generator 44 that forms the particular scramble pattern, such as $P_2$, $P_3$ or $P_4$ of FIGS. 1C, 1D, or 1E, respectively, and supplies it to video descrambler 40 and audio discrambler 41. Video descrambler 40 inverts the polarity of the video signal in response to the scramble pattern, reforms the original video signal and feeds it to buffer amplifier 29 and therethrough terminal a of switch 31. Audio descrambler 41 converts the scrambled audio signal to the original audio signal and feeds it to buffer amplifier 30 and therethrough to terminal a of switch 32. While there are many scrambling approaches that may be followed, scrambling the audio signal with the same scramble pattern used with the video signal can simplify the circuitry. The outputs of switches 31 and 32 are fed terminals 33 and 34, respectively, are fed to the line IN inputs of monitor television 3.

An automatic recording/waiting mode can be selected by providing a selector switch on the video tape recorder, which can be advantageously arranged adjacent the channel selecting buttons. The conditions required for the automatic recording/waiting mode would be the setting of switches 11 and 12 and switches 16 and 17, and placing the tape drive system and power supply to each portion in the stand-by mode. Also, the tuner must be set to select the scrambled broadcast and channel care must be taken that the antenna and not the video camera output is connected to the input of video tape recorder one. An automatic recording/waiting mode button can be utilized to set all of these conditions automatically, or it can set everything else except the channel selector in the tuner and the antenna input, which can be manually selected. A light-emitting diode (LED) can be advantageously used to indicate that the automatic recording/waiting mode is set so that when the consumer retires for the night he is assumed that the scrambled program will be recorded. In place of using the program code in the ten fields (10V) preceding the scrambled program as a starting signal, a special starting code can be inserted in this signal or an analog signal, such as a tone burst signal can be inserted.

Although illustrative embodiments of the present invention have been described in detail above with reference to the accompanying drawing, it is to be understood that the invention is not limited to those precise embodiments, and that various changes and modifications can be effected therein by one skilled in the art without departing from the spirit and scope of the invention, as defined by the appended claims.

What is claimed is:

1. Apparatus for automatically recording transmitted scrambled signals including a scrambled video program signal, a descrambling signal transmitted at least at the start of said scrambled video program signal, and a stop signal transmitted at the end of said scrambled video program signal, the apparatus comprising:

tuner means for receiving said transmitted scrambled signals;

decoder means receiving said transmitted scrambled signals from said tuner means and detecting said descrambling signal and said stop signal for producing a corresponding record start signal in response to an initial detection of said descrabling signal and a corresponding record stop signal in response to detection of said stop signal, respectively; and video recording means receiving said transmitted scrambled signals from said tuner means and said record start signal and said record stop signal from said decoder means for automatically commencing recording said transmitted signals from said tuner means upon receiving said record start signal and for automatically stopping recording upon receiving said record stop signal.

2. Apparatus for recording transmitted scrambled signals according to claim 1, in which said transmitted scrambled signals also include a key code signal for use in descrambling said scrambled signal and said decoder comprises:

signal separator and detector means receiving said transmitted scrambed signals from said tuner means for separating said descrambling signal, said stop signal, and said key code signal therefrom and detecting said descrambling signal, said key code signal and said stop signal; and record command signal generating means receiving said descrambling signal and said stop signal from said signal separator and detector means for producing said record start signal and said record stop signal, respectively, therefrom.

3. Apparatus for recording transmitted scrambled signals according to claim 2, in which said video recording means includes a system controller receiving said record start signal and said record stop signal from said record command signal generating means for producing a corresponding record stop control signal and record circuit means for processing said scrambled video program signal in response to said record start control signal.

4. Apparatus for recording transmitted scrambled signals according to claim 3, in which said video recording means further comprises reproducing means for reproducing said recorded scrambled signals and in which said decoder means comprises memory means connected to said signal separator and detector means for storage and read out of said descrambling signal and said key code signal;

video descrambler means responsive to said key code and said descrambling signal and receiving said reproduced scrambled video program signal for producing a descrambled video signal for visual display.

5. Apparatus for recording transmitted scrambled signals according to claim 4, in which said scrambled video program signal is scrambled by periodic polarity inversions thereof and said video descrambler means comprises a descramble pattern generator for duplicating the scramble pattern used to scramble said video program signal received by said tuner means, and means for inverting the polarity of said scrambled signal in response to said descramble pattern.

6. A method of automatically recording a transmitted signal including a coded television program signal, decoding signals transmitted at least at the start of said coded television program signal, and a coded stop signal transmitted at the end of said coded television program signal, comprising the steps of:

receiving the transmitted signal and feeding it to a video recorder and a signal decoder;
detecting the presence of said decoding signals in said signal decoder;
generating a recording start signal upon an initial detection of said decoding signals for starting said video recorder;
recording the transmitted signal including the coded television program signal;
detecting the presence of said stop signal in said signal decoder; and
generating a recording stop signal upon said detection of said stop signal for stopping the recording of said transmitted signals in said video recorder.

7. A method of recording a transmitted signal according to claim 6, in which the step of detecting the presence of said decoding signals and the step of detecting the presence of said signal are both preceded by the step of separating said decoding signals and said stop signal from said transmitted signal that is received.

8. A method of recording transmitted signal according to claim 6, in which the step of recording the coded television program signal includes initially processing said coded television program signal for recording as a series of parallel slanted tracks on a magnetic tape by the video recorder.

9. A method of recording a transmitted signal according to claim 8, in which the step of generating a record start signal and the step of generating a record stop signal both include the step of controlling said processing of said coded television program signal in response thereto.

10. A method of recording a transmitted signal according to claim 6, further comprising the steps of:

storing said decoding signals received in said decoder in a memory;
generating a decode pattern from said stored decoding signals;
reproducing said recorded coded television program signal;
feeding the reproduced coded television program signal and said generated decode pattern to a video decoder;
decoding the reproducing coded television program signal in said video decoder; and
displaying the decoded reproduced television program signal.

11. A method of recording a transmitted signal according to claim 10, in which said decoding signals includes a key code arranged after said coded television program signal and in which the step of storing said decoding signals in said memory include the step of storing said key code therein after the entire coded television program signal has been recorded.

12. A method of recording a transmitted signal according to claim 10, in which said coded television program signal includes a coded audio signal and further comprising the step of generating an audio decode pattern and decoding said audio signal for reproduction.

13. Apparatus for automatically recording a transmitted signal including a coded television program, a decoding signal transmitted at least at the start of said coded television program, and a coded stop signal transmitted at the end of said coded television program, the apparatus comprising:

a video recorder;
means for receiving the transmitted signal and feeding the received signal to video recorder;
means for detecting the presence of said decoding signal and the presence of said coded stop signal in the received signal; and
means for generating a record start signal fed to said video recorder in response to an initial detection of said decoding signal to start recording the received signal in said video recorder and for generating a record stop signal fed to said video recorder upon detecting said coded stop signal for stopping the recording of the received signal in said video recorder.

14. Apparatus for recording a transmitted signal according to claim 13, further comprising code separating means for separating said decoding signal and said stop signal from said coded television program and feeding said separated signals to means for detecting the presence of said decoding signal and said means for detecting the presence of said code stop signal.

15. Apparatus for recording a transmitted signal according to claim 13. further comprising recording processing means receiving said coded television program for processing said program signal for recording as a series of parallel slanted tracks on a magnetic tape by said video recorder.

16. Apparatus for recording a transmitted signal according to claim 15, further comprising controller means receiving said record start signal and record stop signal for controlling the operation of said processing means in response thereto.

17. Apparatus for recording a transmitted signal according to claim 13, further comprising:

memory means for storing said decoding signals therein;
decode pattern generator means for generating a decode pattern from said stored decoding signals;
means for controlling said video recorder to reproduce said recorded coded television program;
video decoder means receiving said reproduced coded television program and said decode pattern for decoding said reproduced coded television program; and means for displaying the reproduced decoded television program.

18. Apparatus for recording a transmitted signal according to claim 13, in which said coded television program includes a coded audio signal and further comprising means for generating an audio decode pattern and means for decoding said audio signal for reproduction.

* * * * *